US008209318B2

(12) United States Patent
Lee (10) Patent No.: US 8,209,318 B2
(45) Date of Patent: Jun. 26, 2012

(54) PRODUCT SEARCHING SYSTEM AND METHOD USING SEARCH LOGIC ACCORDING TO EACH CATEGORY

(75) Inventor: Hyang Cheol Lee, Seoul (KR)

(73) Assignee: NHN Business Platform Corporation, Seongnam-Si (KR)

( * ) Notice: Subject to any disclaimer, the term of this patent is extended or adjusted under 35 U.S.C. 154(b) by 575 days.

(21) Appl. No.: 11/459,681

(22) Filed: Jul. 25, 2006

(65) Prior Publication Data

US 2007/0027856 A1 Feb. 1, 2007

(30) Foreign Application Priority Data

Jul. 27, 2005 (KR) ........................ 10-2005-0068521

(51) Int. Cl.
*G06F 7/00* (2006.01)

(52) U.S. Cl. ...................................................... 707/708

(58) Field of Classification Search ............... 707/3, 708
See application file for complete search history.

(56) References Cited

U.S. PATENT DOCUMENTS

| 6,366,910 | B1 * | 4/2002 | Rajaraman et al. ............... 707/5 |
| 6,584,470 | B2 * | 6/2003 | Veale ............................. 707/102 |
| 7,206,778 | B2 * | 4/2007 | Bode et al. ........................ 707/5 |
| 2001/0044758 | A1 * | 11/2001 | Talib et al. ....................... 705/27 |
| 2002/0083062 | A1 * | 6/2002 | Neal et al. ....................... 707/10 |
| 2003/0033295 | A1 * | 2/2003 | Adler et al. ....................... 707/3 |

FOREIGN PATENT DOCUMENTS

| KR | 10-2002-0065048 | 8/2002 |
| KR | 10-0460008 | 11/2004 |

* cited by examiner

*Primary Examiner* — Jensen Hu
(74) *Attorney, Agent, or Firm* — Husch Blackwell LLP (57) ABSTRACT

A product search system and a product search method which is performed in the product search system. The product search system includes: maintaining a database including a product identifier and a product category of the product identifier; receiving an original query for search of a product from a user terminal, and extracting a category query associated with the original query; selecting at least one product category included in the database, as a category corresponding to the original query, using the category query; identifying a product identifier type associated with the selected category; searching the database by applying a search logic corresponding to the identified product identifier type from a plurality of search logics; and outputting a result of the search as a product identifier type that matches the original query.

14 Claims, 8 Drawing Sheets

| PRODUCT IDENTIFIER (301) | PRODUCT CATEGORY (302) | SEARCH FIELD (303) |
|---|---|---|
| KTF-X5500 | ELECTRONICS/ MOBILEPHONES> MOBILE PHONES/ PDAS/NAVIGATIONS> MOBILE PHONES | . . .<br><br><brand>KTF EVER</brand><br><model>KTF-X5500</model><br><item>MOBILE PHONE</item><br><br>. . .<br><br><keyword>KTF</keyword><br><keyword>SONGHAEGYOPHONE</keyword><br><keyword>DJPHONE</keyword><br><br>. . . |
| . . . | . . . | . . . |

PRODUCT SEARCHING SYSTEM AND METHOD USING SEARCH LOGIC ACCORDING TO EACH CATEGORY

CROSS-REFERENCE TO RELATED APPLICATION

This application claims the benefit of Korean Patent Application No. 10-2005-0068521, filed on Jul. 27, 2005, in the Korean Intellectual Property Office, the disclosure of which is incorporated herein by reference.

BACKGROUND OF THE INVENTION

1. Field of the Invention

The present invention generally relates to a product search system and a product search method which is performed in the product search system. More particularly, the present invention relates to a product search system and method which can select a category corresponding to an original query entered by a user, identify a product identifier type associated with the selected category, apply a search logic corresponding to the identified product identifier type, search for a product identifier that matches the original query, and output a retrieved product identifier for the user.

2. Description of Related Art

Generally, a website such as a shopping mall site, a shopping mall related site, and the like, provides a user with a product search window on its webpage. When the user enters a query, such as a brand name, a product type, a product model name, etc., on the product search window, the website provides the user with product categories including the query, and products for each of the product categories.

Such shopping-related websites have provided a conventional database search system. In this instance, the conventional database search system outputs only search results which include an entered original query as it is. Specifically, the conventional database search system may not output a predetermined number of search results that may match the original query by processing the original query via a plurality of operations according to various types of search logics. Specifically, the shopping-related websites currently output search results simply based on whether product categories and products for each of the product categories include the original query entered by the user. Accordingly, a category and products which match the original query may not be retrieved, 1) when the original query entered by the user is inaccurate, 2) when the original query entered by the user is a particular keyword since a keyword registered for each product is not used, or 3) when the original query entered by the user includes a mistyped character or missing character.

Further objectives and advantages of the present invention will become apparent from a careful reading of a detailed description provided hereinbelow, with appropriate reference to accompanying drawings.

BRIEF SUMMARY OF INVENTION

The present invention provides a product search method and system which can output a predetermined number of search results that may match an original query entered by a user, by altering a database search method of a conventional shopping-related website that accurately provides only search results including the original query, and thus, processing the original query via a plurality of operations according to various types of search logics.

The present invention also provides a product search method and system which can more effectively search for products that may match a corresponding query for each category, by selecting a category corresponding to the query, applying a different search logic according to a product identifier type of the selected category, and thereby, retrieving the goods.

According to one aspect of the present invention, there is provided a product search method in a product search system, the method including: maintaining a database including a product identifier and a product category of the product identifier; receiving an original query for search of a product from a user terminal, and extracting a category query associated with the original query; selecting at least one product category included in the database, as a category corresponding to the original query, using the category query; identifying a product identifier type associated with the selected category; searching the database by applying a search logic corresponding to the identified product identifier type from a plurality of search logics; and outputting a result of the search as a product identifier type that matches the original query.

According to another aspect of the present invention, there is provided a product search method, wherein, when the identified product identifier type is an electronics/computer type, the searching of the database comprises: searching the database using a first query which is generated by removing a space or a special character from the original query, and generating a first search result; separating the original query into a plurality of words according to the space, searching the database by using a word as a second query among the plurality of words, and generating a second search result when a number of the first search results is less than a predetermined reference value, the word comprising at least one of the group including alphabetic characters, numerals, special characters, and combinations thereof; and searching the database by using a word as a third query among the second query, and generating a third search result when an addition of the number of the first search results and the number of the second search results is less than the reference value, the word having a first letter as an alphabetic character and having a last letter as an alphabetic character or a numeral, and which includes at least one numeral, and the outputting of the search result outputs at least one of the first search result, the second search result, and the third search result as the product identifier that matches the original query.

According to still another aspect of the present invention, there is provided a product search system including: a database including a product identifier and a product category of the product identifier; a receiving unit receiving an original query for search of a product from a user terminal; an extraction unit extracting a category query associated with the original query; a category selection unit selecting at least one product category included in the database, as a category corresponding to the original query, using the category query; a product identifier type identifying unit identifying a product identifier type associated with the selected category; a search unit searching the database by applying a search logic corresponding to the identified product identifier type from a plurality of search logics; and an outputting unit outputting a result of the search as a product identifier that matches the original query.

BRIEF DESCRIPTION OF THE DRAWINGS

The above and/or other aspects and advantages of the present invention will become apparent and more readily appreciated from the following detailed description, taken in conjunction with the accompanying drawings of which.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein. Like numbers utilized throughout the various Figures designate like or similar parts.

DETAILED DESCRIPTION OF INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
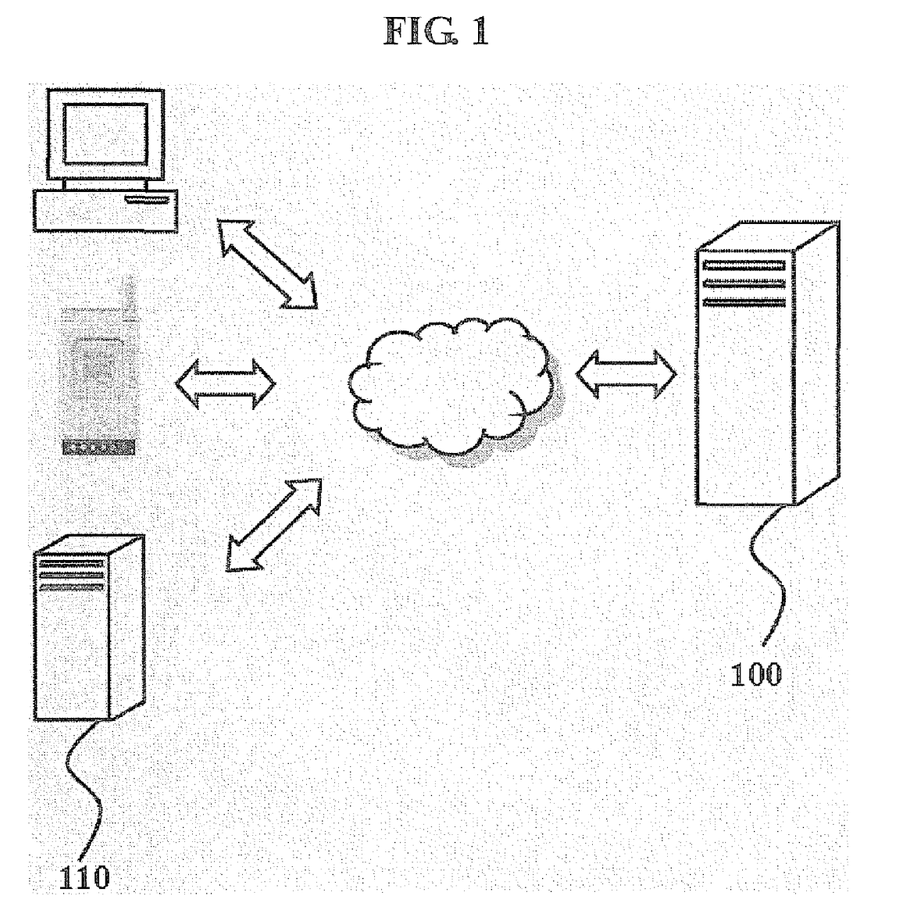
FIG. 1 is a diagram illustrating a network connection of a user terminal and a product search system according to an embodiment of the present invention.

FIG. 1 is a diagram illustrating a network connection of a user terminal 110 and a product search system 100 according to an embodiment of the present invention. As shown in FIG. 1, the product search system 100 according to the present embodiment is connected to the user terminal 110 of a user who desires to search for a product via a wired/wireless network.

The product search system 100 maintains a database which includes a product identifier and a product category of the product identifier, receives an original query for search of a product from the user terminal 110 which accesses the product search system 100, and extracts a category query associated with the original query. Also, the product search system 100 selects at least one product category included in the database, as a category corresponding to the original query, using the category query, identifies a product identifier type associated with the selected category, and thereby, searches the database by applying a search logic corresponding to the identified product identifier type from a plurality of search logics. Through the above process, the product search system 100 outputs a search result as a product identifier that matches the original query. Accordingly, the user refers the output product identifier to the user terminal 100, and selects a product identifier of desired product, and thereby, views the goods or proceeds to a payment procedure.

Figure 2:
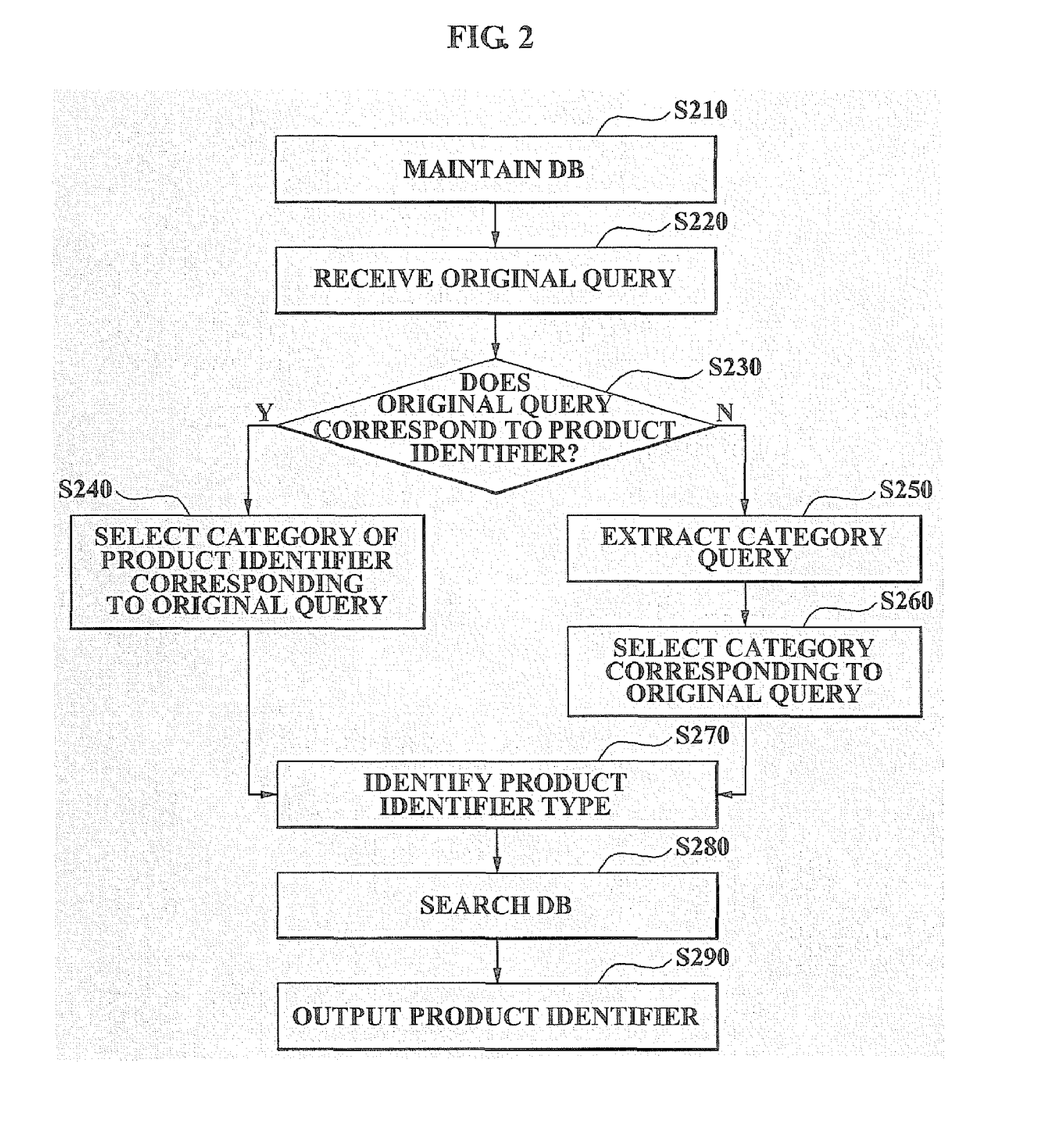
FIG. 2 is a flowchart illustrating a product search method according to an embodiment of the present invention.

FIG. 2 is a flowchart illustrating a product search method according to an embodiment of the present invention. The product search method according to the present embodiment may be performed in a predetermined product search system.

In operation S210, the product search system maintains a database which includes a product identifier and a product category of the product identifier.

Figure 3:
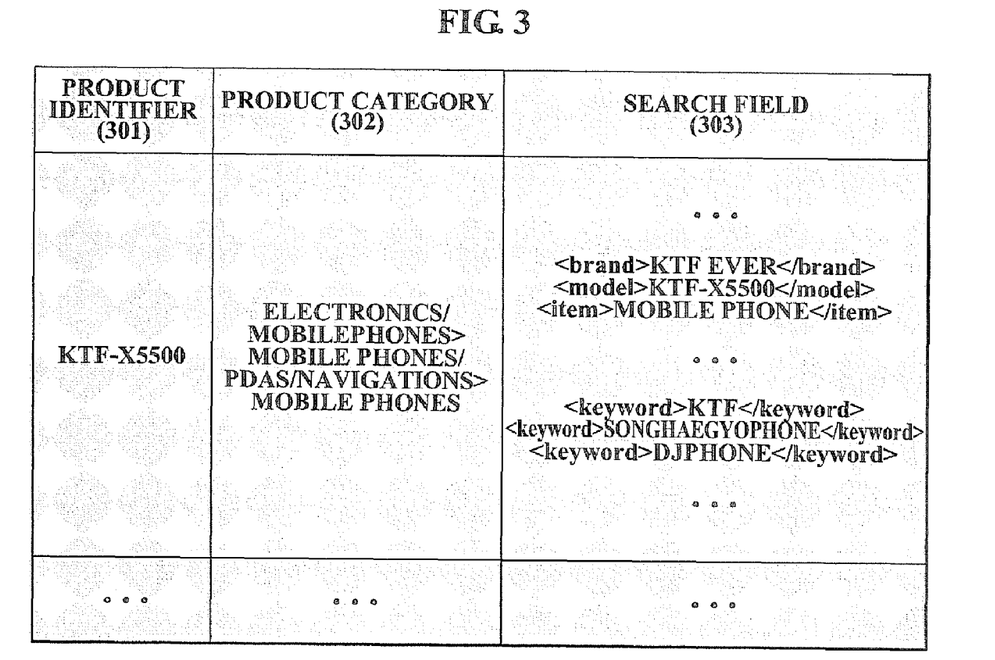
FIG. 3 is a diagram illustrating an example of a database according to an embodiment of the present invention.

FIG. 3 is a diagram illustrating an example of a database according to an embodiment of the present invention. As shown in FIG. 3, the database may include a product identifier 301 which is used in the product search system, a product category 302 of each of the product identifiers 301, and a search field 303.

The product identifier 301 is utilized for identifying each product model and the like in the product search system. The product category 302 is an internal category of the product search system representing the product identifier 301. The product category 302 may be stored in a type of an identifier indicating a category. The search field 303 is searched when searching for a recommendation category using a category query, or when searching for a product identifier using various types of search logics according to the present invention. The search field 303 may include category information or any type of information associated with the each product model, e.g. a brand, a model name, an item name, a keyword, etc. As an example, the search field 303 may include only information on the product identifier 301. Alternatively, the search field 303 may include information on both the product identifier 301 and the product category 302.

In FIG. 3, the product category 302 is recorded in the database as a separate data field from the search field 303. However, it is only an example and the present invention is not limited thereto. The product category 302 may be included in the search field 303, not in a separate data field.

In operation S220, the product search system receives an original query for search of a product from a user terminal. In this instance, the original query includes any type of query which is entered by the user to search the user's desired goods, e.g. a brand, a product type, a product model name, etc.

In operation S230, the product search system determines whether a product identifier corresponding to the received original query exists.

Specifically, as an example, when the original query and the good identifier are compared, the product search system determines whether the product identifier corresponding to the received original query from the user terminal exists among product identifiers used in the product search system.

In operation S240, when the corresponding product identifier exists, the product search system selects a product category including the product identifier as a category corresponding to the received original query.

In operation S250, when the corresponding product identifier does not exist, the product search system extracts a category query associated with the received original query. In this instance, the category query may be extracted by using various types of methods. In one embodiment, the product search system may extract the category query by removing a space from the original query or by a unit of space delimited words. Also, the product search system may extract the category query by analyzing a morpheme of the original query. Also, the product search system may sequentially perform category query extracting methods described above and thereby, extract the category query until a predetermined search condition is satisfied. In further embodiment, when the product identifier is retrieved by using the category query which is extracted by removing a space from the original query, and in this case, a desired number of search results corresponding to a desired condition is not generated, the product search system may extract the category query from the original query by a unit of space delimited words. Even in this case, when the desired number of search results corresponding to the desired condition is not generated, the product search system may extract the category query by analyzing the morpheme of the original query.

In operation S260, the product search system selects at least one product category included in the database, as a category corresponding to the original query, using the category query.

Figure 4:
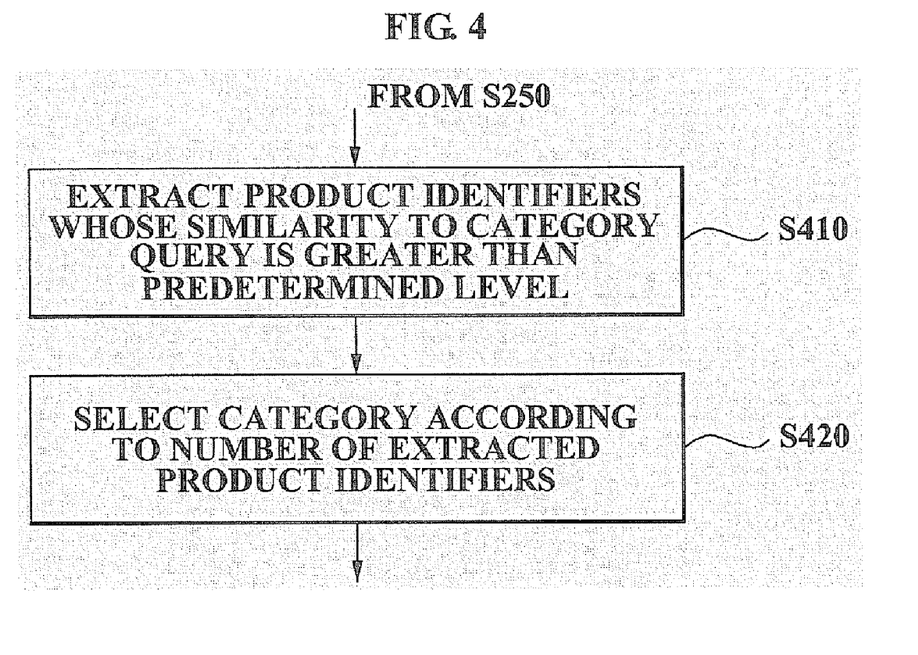
FIG. 4 is a flowchart illustrating an example of a category selection process shown in FIG. 2.

FIG. 4 is a flowchart illustrating an example of operation S260 shown in FIG. 2.

Referring to FIG. 4, in operation S410, the product search system searches the database using the category query and extracts product identifiers whose similarity to the category query is greater than a predetermined level. As an example, in operation S410, the product search system may extract product identifiers whose similarity is greater than 0.5.

In this instance, various types of methods may be utilized for measuring the similarity. As far as a similarity between the extracted category query and database information is measured, any type of method can be utilized for calculating the similarity, which still falls within the scope of the present invention. In further embodiment, the similarity may be an identical concept to the similarity disclosed in "Optimizing the weight of added terms in query expansion" which is published in pages 241 through 246 of a 9th arts and science competition held by Korea Association of Information Education.

In operation S420, the product search system selects at least one product category as a category corresponding to the original query, in an order of a greater number of the extracted product identifiers.

Figure 5:
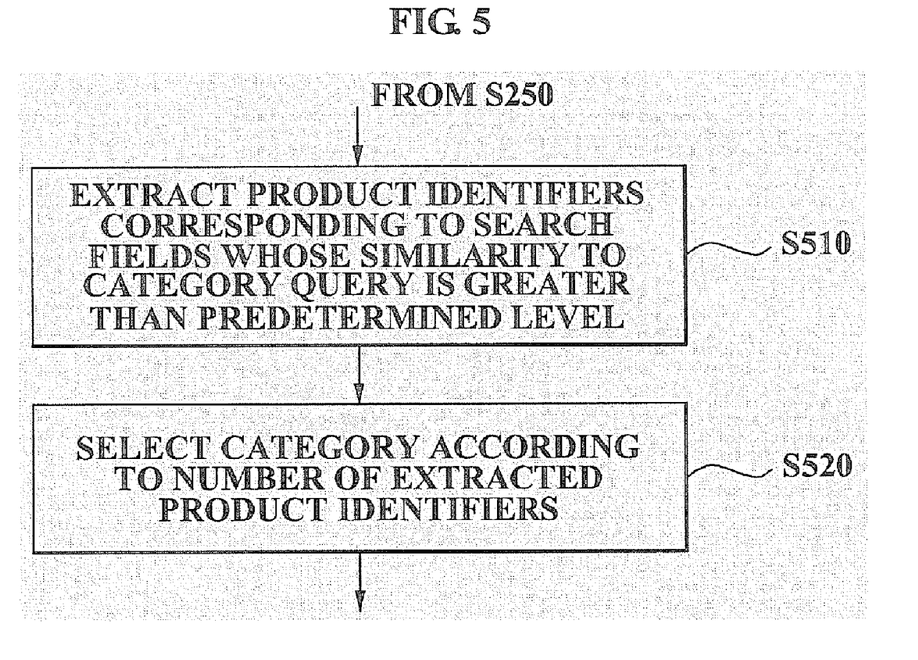
FIG. 5 is a flowchart illustrating another example of a category selection process shown in FIG. 2.

FIG. 5 is a flowchart illustrating another example of operation S260 shown in FIG. 2. In this instance, it is assumed that a database includes a search field which is generated using a product identifier and a product category.

Referring to FIG. 5, in operation S510, the product search system searches the database using an extracted category query, and extracts product identifiers corresponding to search fields whose similarity to the category query is greater than a predetermined level. Specifically, since product identifiers are extracted based on the similarity between the search field which is generated by using the product identifier and the product category, and the extracted category query, a category that is more appropriate to the original query may be selected. In this instance, the similarity may be measured using various types of methods. As an example, in operation S510, the product search system may extract product identifiers whose similarity between the search field and the category query is greater than 0.5.

In operation S520, the product search system selects at least one product category as a category corresponding to the original query, in an order of a greater number of the extracted product identifiers.

Referring again to FIG. 2, in operation S270, the product search system identifies a product identifier type associated with the selected category. In operation S280, the product search system searches the database by applying a search logic corresponding to the identified product identifier type from a plurality of search logics. Finally, in operation S290, the product search system outputs the search result as a product identifier that matches the original query.

Figure 6:
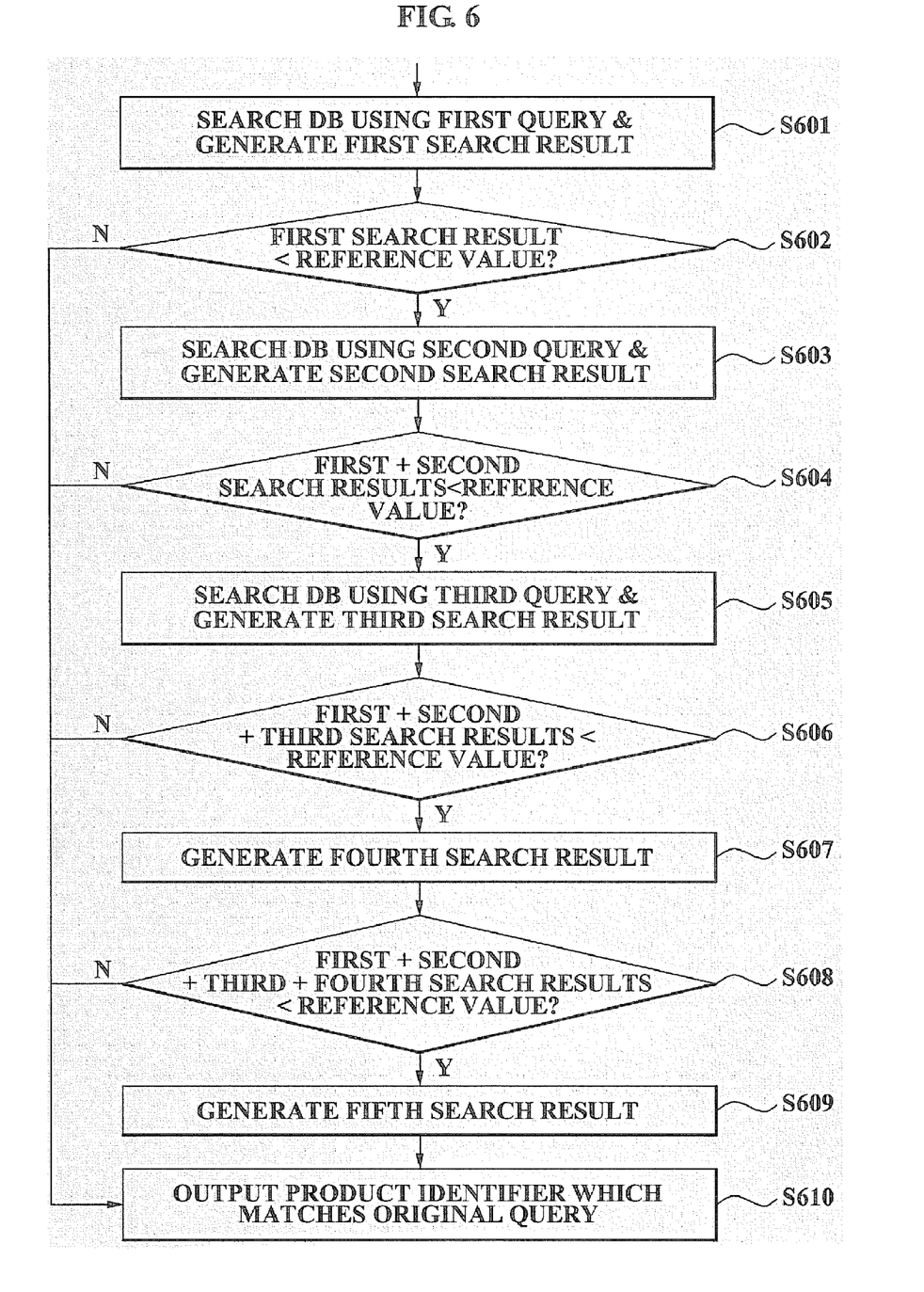
FIG. 6 is a flowchart illustrating a database search process in a product search method according to an embodiment of the present invention.

FIG. 6 is a flowchart illustrating a database search process in a product search method according to an embodiment of the present invention.

The present embodiment relates to a database search process which is performed when the identified product identifier type is an electronics/computer type. The product search system performs a product identifier search process by applying a search logic corresponding to the electronics/computer type.

Namely, the product search system analyzes a type of the product identifier. When the product identifier type is the electronics/computer type, the product search system applies a search logic which is suitable for the electronics/computer type. In this instance, the electronics/computer type indicates a product identifier type thereof which consists of a combination of alphabetic characters, numerals, and special characters, but this is only for convenience of description and is not limited thereto. The corresponding product may not belong to the electronics/computer type.

In the case of goods which are classified into the electronics/computer type, the product identifier generally includes a combination of alphabetic characters, numerals, and special characters. Also, in the case of Hangul which is the Korean language, the product identifier generally describes the product. Accordingly, when performing a search according to the product search method as shown below in FIGS. 6 and 7, a most appropriate search result may be outputted.

In operation S601, the product search system searches the database using a first query which is generated by removing a space or a special character from the original query, and generates a first search result. As an example, the product search system may generate the first query by removing ' ', '/', '−', and '+' from the original query, and generate the first search result including the first query.

In operation S602, the product search system determines whether a number of the first search results is less than a predetermined reference value. As an example, the predetermined reference value may be set to a value from 50 to 100. When the reference value is 50, the product search system may determine whether the number of the first search results is less than 50 in operation S602, and determine which following operation to progress to. When the number of the first search results is determined to be not less than the reference value in operation S602, the product search system performs operation S610 and outputs the first search result as the product identifier that matches the original query. However, when the number of the first search results is determined to be less than the reference value, the product search system performs operation S603.

In operation S603, the product search system separates the original query into a plurality of words according to the space, searches the database by using a word as a second query among the plurality of words, and generates a second search result. In this instance, the word includes at least one of the group including alphabetic characters, numerals, special characters, and combinations thereof. As an example, the product search system may separate the original query into a plurality of words according to ' ', generate words which consist of only alphabetic characters, numerals, '/', '−' and '+', as the second query, search the database by using the generated second query, and generate the second search result. The above process is performed with assumption that English words have a more important meaning. Depending upon the assumption, words that are determined to be unnecessary for a search may be removed.

In operation S604, the product search system determines whether an addition of the number of the first search results and the number of the second search results is less than the reference value. As an example, when the reference value is 50, the product search system may determine whether the addition of the number of the first search results and the number of the second search results is less than 50 in operation S604, and determine which following operation to progress to. When an addition of the number of the first search results and the number of the second search results is not less than the reference value in operation S604, the product search system performs operation S610, and outputs the first search result and the second search result as the product identifier that matches the original query. However, when the addition of the number of the first search results and the number of the second search results is less than the reference value, the product search system performs operation S605.

In operation S605, the product search system searches the database by using a word having a first letter as an alphabetic character and having a last letter as an alphabetic character or a numeral, and which includes at least one numeral, as a third query among the second query, and generates a third search result. In this case, the product search system arranges a plurality of third queries according to descending series based on a length of each of the plurality of third queries. Also, the product search system searches the database according to the arranged order and generates the third search result.

Figure 7:
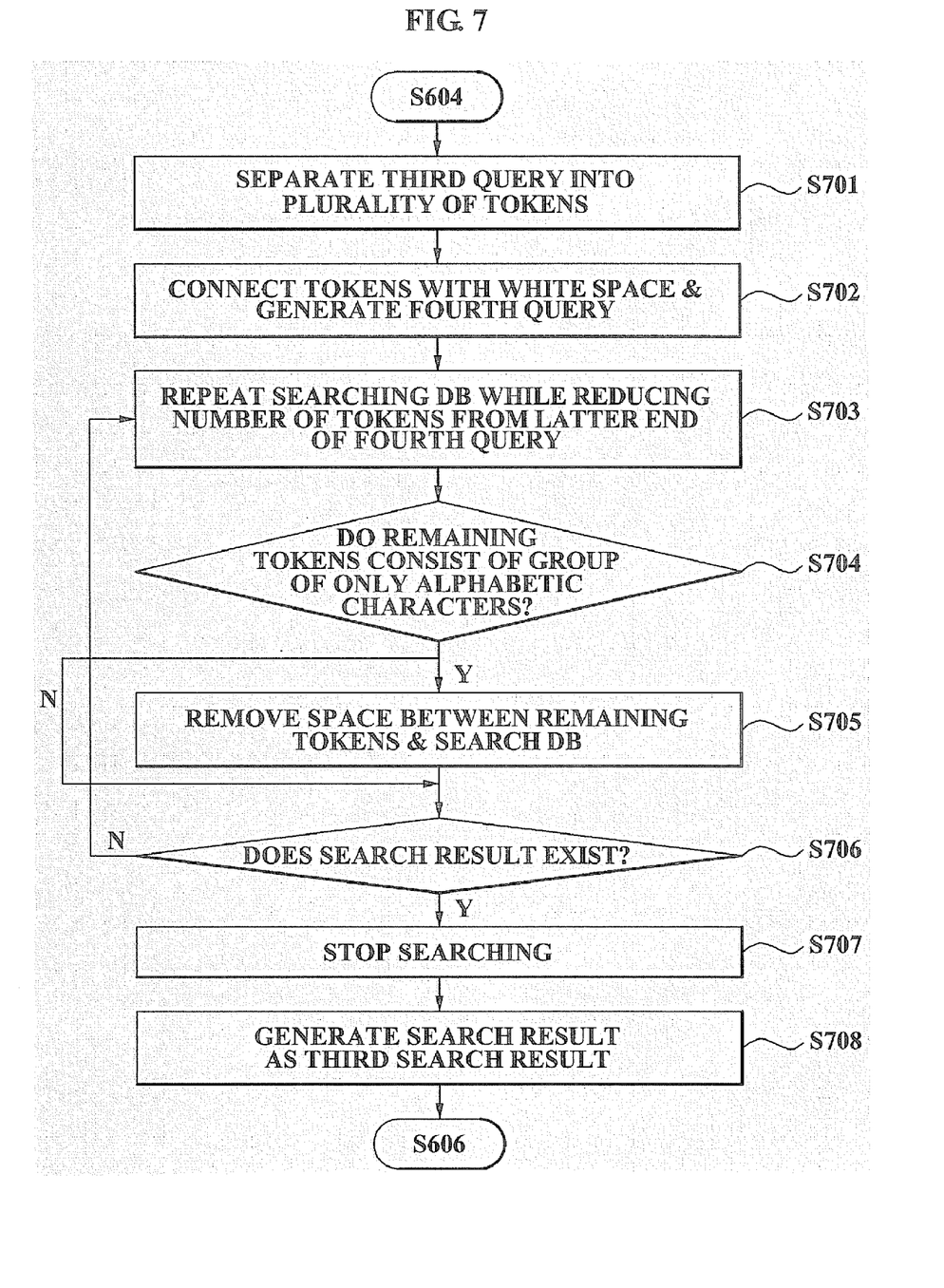
FIG. 7 is a flowchart illustrating a process of separating a third query into a plurality of tokens and outputting search results that match an original query via various types of processing logics according to an embodiment of the present invention.

FIG. 7 is a flowchart illustrating a process of separating the third query into a plurality of tokens and outputting a search result that matches the original query via various types of processing logics according to an embodiment of the present invention. Operations S701 through S708 shown in FIG. 7 may be included in operation S605 of FIG. 6.

In operation S701, the product search system separates the third query into tokens which consist of a group of only alphabetic characters or a group of only numerals. The product search system may separate the third query, 'DGB-020BE' for example, into the plurality of tokens which consist of a group of only alphabetic characters or a group of only numeral, such as 'DGB', '020', and 'BE'.

In operation S702, the product search system connects the tokens with a space ' ' and generates a fourth query. In operation S703, the product search system repeats searching the database, while reducing a number of the tokens included in the fourth query from a tail end of the fourth query. As an example, while reducing the number of tokens included in the fourth query from the tail end of the fourth query, in an order of 'DBG 020 BE', 'DGB 020', and 'DGB', the product search system may repeat searching the database.

In operation S704, the product search system determines whether remaining tokens in operation S703 correspond to a token which consists of only alphabetic characters. When the remaining tokens are determined to not correspond to the token which consists of only alphabetic characters in operation S704, the product search system performs operation S706, and determines whether a search result exists. However, when the remaining tokens are determined to correspond to the token which consists of the group of only alphabetic characters in operation S704, the product search system performs operation S705.

In operation S705, the product search system removes a space between the remaining tokens, and searches the database. As an example, in operation S701, the product search system may separate the third query KTF-X5500 into a plurality of tokens which consist of only alphabetic characters or a group of only numerals, such as 'KTF', 'X,' and '5500'. In operation S702, the product search system may connect the plurality of tokens with a space and generate the fourth query 'KTF X 5500'. In operation S703, the product search system repeats searching using 'KTF X 5500' and 'KTF X', while reducing the number of tokens from the tail end of the fourth query. In this instance, when the remaining tokens are determined to correspond to a token which consists of only alphabetic characters, such as 'KTF X' as a result of the determination in operation S704, the product search system may remove the space between the remaining tokens, generate 'KTF X,' and search the database using the 'KTFX' in operation S705.

In operation S706, the product search system determines whether a search result exists during the searching in operation S705. In operation S707, when the search result exists, the product search system stops the searching. However, when the search result does not exist, the product search system re-performs operations from operation S703 and repeats the searching. In the above example, the product search system searches the database using 'KTFX' in operation S705. In this instance, when the search result is determined to not exist in operation S706, the product search system may re-perform operations from operation S703 and repeat searching the database while reducing the number of tokens from the tail end, such as 'KTF X' and 'KTF'. When the search result is determined to exist during operations S703 through S705 as a result of the determination of operation S706, the product search system stops the searching in operation S707, and generates the search result as the third search result in operation S708. A detailed process of operation S605 for generating the third search result has been described in detail with reference to FIG. 7. Hereinafter, the present invention will continue to be described with reference to FIG. 6.

In operation S606, the product search system determines whether an addition of the number of the first search results, the number of the second search results, and the number of the third search results is less than the reference value. As an example, when the reference value is 50, the product search system may determine whether the addition of the number of the first search results, the number of the second search results, and the number of the third search results is less than 50, and determine which following operation to progress to. When the addition of the number of the first search results, the number of the second search results, and the number of the third search results is not less than the reference value in operation S606, the product search system performs operation S610 and outputs the first search result, the second search result, and the third search result as the product identifier that matches the original query. However, when the addition of the number of the first search results, the number of the second search results, and the number of the third search results is less than the reference value in operation S606, the product search system performs operation S607.

In operation S607, the product search system separates the original query into a plurality of tokens using a predetermined engine indexer, searches the database using the tokens, and generates a fourth search result.

In operation S608, the product search system determines whether an addition of the number of the first search results, the number of the second search results, the number of the third search results, and the number of the fourth search results is less than the reference value. When the addition of the number of the first search results, the number of the second search results, the number of the third search results, and the number of the fourth search results is not less than the reference value in operation S608, the product search system performs operation S610, and outputs the first search result, the second search result, the third search result, and the fourth search result, as the product identifier that matches the original query. However, when the addition of the number of the first search results, the number of the second search results, the number of the third search results, and the number of the fourth search results is less than the reference value in operation S608, the product search system performs operation S609.

In operation S609, the product search system generates a fifth search result which includes at least one token in the database. Namely, when a number of preceding outputted search results is less than the reference value, the product search system performs searching with respect to any word which includes at least one token.

In operation S610, the product search system outputs at least one of the first search result, the second search result, the third search result, the fourth search result, and the fifth search result, as the product identifier that matches the original query.

Hereinafter, a product search method according to another embodiment of the present invention will be described.

Figure 8:
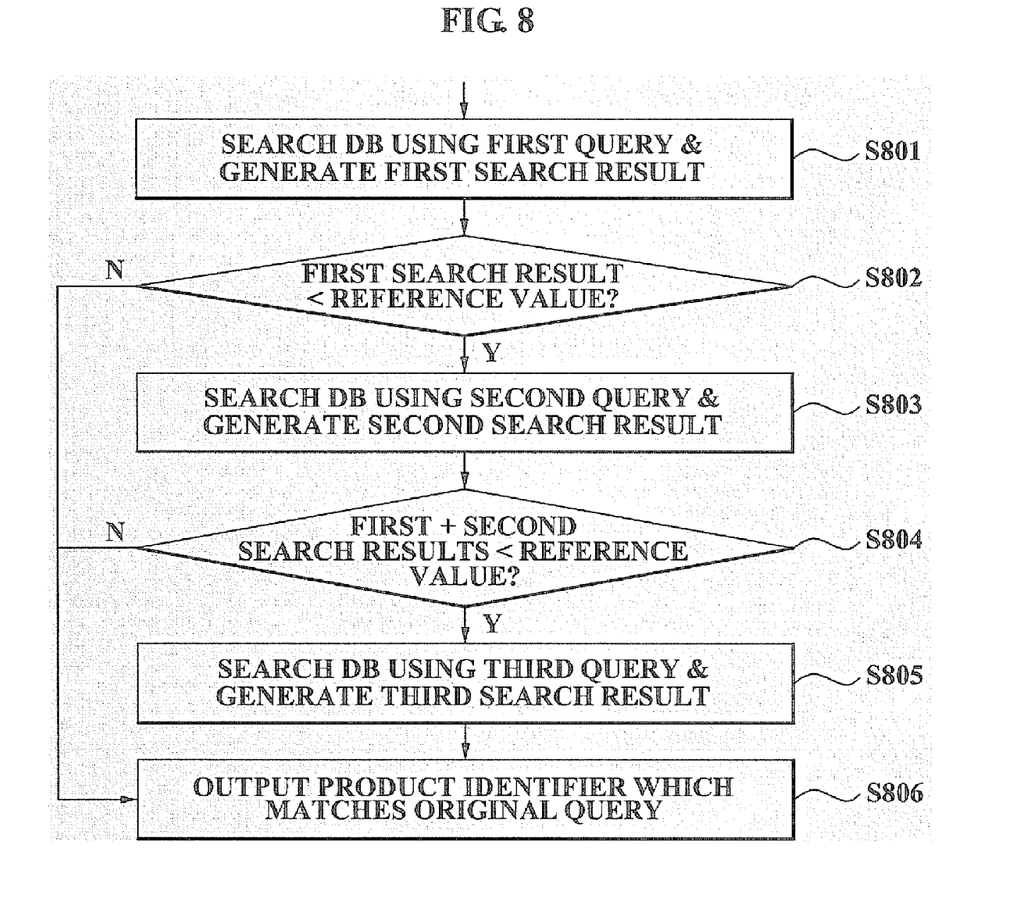
FIG. 8 is a flowchart illustrating a database search process in a product search method according to another embodiment of the present invention.

FIG. 8 is a flowchart illustrating the database search process in a product search method according to another embodiment of the present invention. The present embodiment is the database search process which is performed when the identified product identifier type is a brand type. In this case, the product search system searches for the product identifier by applying a search logic corresponding to the brand type. In the case of a product model which is classified into the brand type, a product model name generally consists of numerals or a combination of alphabetic characters and numerals. Also, in the case of Hangul, the product identifier generally describes the goods. Accordingly, when performing the product search method according to the present embodiment, a most appropriate search result may be outputted.

In operation S801, the product search system searches the database using a first query which is generated by removing a space or a special character from the original query, and generates a first search result. As an example, the product search system may generate the first query by removing ' ', '/', '−', and '+' from the original query, and generate the first search result including the first query.

In operation S802, the product search system determines whether a number of the first search results is less than a predetermined reference value. When the number of the first search results is determined to be not less than the reference value in operation S802, the product search system performs operation S806 and outputs the first search result as a total search result. However, when the number of the first search results is determined to be less than the reference value, the product search system performs operation S803.

In operation S803, when the number of the first search results is less than the reference value, the product search system separates the original query into a plurality of words according to the space, searches the database by using a word as a second query among the plurality of words, and generates a second search result when a number of the first search results is less than a predetermined reference value. In this instance, a first letter and a last letter of the word are alphabetic characters or numerals and the word includes at least one numeral. As an example, when the original query is "tag heuer sunglasses [1000002538]", the product search system may determine '1000002538' as the second query, and search the database using '1000002538'. As another example, when the original query is "[6 month installation no interest] ferragamo bracelet [34-2821_exp]", the product search system may determine '34-2821_esp' as the second query and search the database. In this case, the product search system arranges a plurality of second queries according to descending series based on a length of each of the plurality of second queries. Also, the product search system searches the database according to the arranged order and generates the second search result.

In operation S804, the product search system determines whether an addition of the number of the first search results and the number of the second search results is less than the reference value. When the addition of the number of the first search results and the number of the second search results is determined to be not less than the reference value in operation S804, the product search system performs operation S806, and outputs the first search result and the second search result as the total search result. However, when the addition of the number of the first search results and the number of the second search results is determined to be less than the reference value, the product search system performs operation S805.

In operation S805, the product search system separates the second query into a space or a special character, generates a plurality of tokens, searches the database by using a third query which is generated by connecting the plurality of tokens with the space, and generates a third search result. As an example, the product search system may separate the second query using '/', '−', '+', '_', '.', etc., and generate the plurality of tokens.

Also, in operation S805, the product search system may generate the third search result by repeating searching the database while reducing a number of the tokens included in the third query from a tail end of the third query. As an example, when the third query is "34-2821_esp", the product search system may repeat searching the database in an order of '34 2821 esp', '34 2821', and '34'. As another example, when the third query is "DGB 020 BE", the product search system may repeat searching the database while reducing the number of tokens included in the third query from the tail end of the third query, in an order of 'DBG 020 BE', 'DGB 020' and 'DGB'. Also, in this case, when a search result exists during operation S805, the product search system stops the searching, and may generate the existing search result as the third search result.

In operation S806, the product search system outputs at least one of the first search result, the second search result, and the third search result as the product identifier that matches the original query.

Hereinafter, a product search method according to another embodiment of the present invention will be described with reference to FIG. 8. The present embodiment is a database search process which is performed when the identified product identifier type is a brand type, such as cosmetics, powdered milk, diapers, or other general product identifier type. The product search system performs the product identifier search by applying a search logic corresponding to the cosmetics, powdered milk, diapers, or other general product identifier type. In the case of a product model which is classified into the cosmetics, powdered milk, diapers, or other general product identifier type, a product model name is generally a name written in Hangul. Accordingly, when performing the product search method according to the present embodiment rather than the previously-described embodiment, a most appropriate search result may be outputted.

In operation S801, the product search system searches the database using a first query which is generated by removing a space or a special character from the original query, and generates a first search result.

In operation S802, the product search system determines whether a number of the first search results is less than a predetermined reference value. When the number of the first search results is determined to be not less than the reference value in operation S802, the product search system performs operation S806 and outputs the first search result as the product identifier that matches the original query. However, when the number of the first search results is determined to be less than the reference value, the product search system performs operation S803.

In operation S803, the product search system searches the database using a second query which is generated by separating the original query according to a space, and generates a second search result.

In operation S804, the product search system determines whether an addition of the number of the first search results and the number of the second search results is less than the reference value. When the addition of the number of the first search results and the number of the second search results is determined to be not less than the reference value in operation S804, the product search system performs operation S806, and outputs the first search result and the second search result as the product identifier that matches the original query. However, when the addition of the number of the first search results and the number of the second search results is determined to be less than the reference value, the product search system performs operation S805.

In operation S805, the product search system searches the database using a third query which is generated by analyzing a morpheme of the original query, and generates a third search result.

In operation S806, the product search system outputs at least one of the first search result, the second search result, and the third search result as the product identifier that matches the original query.

The product search method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Hereinafter, a product search system according to another embodiment of the present invention will be described.

Figure 9:
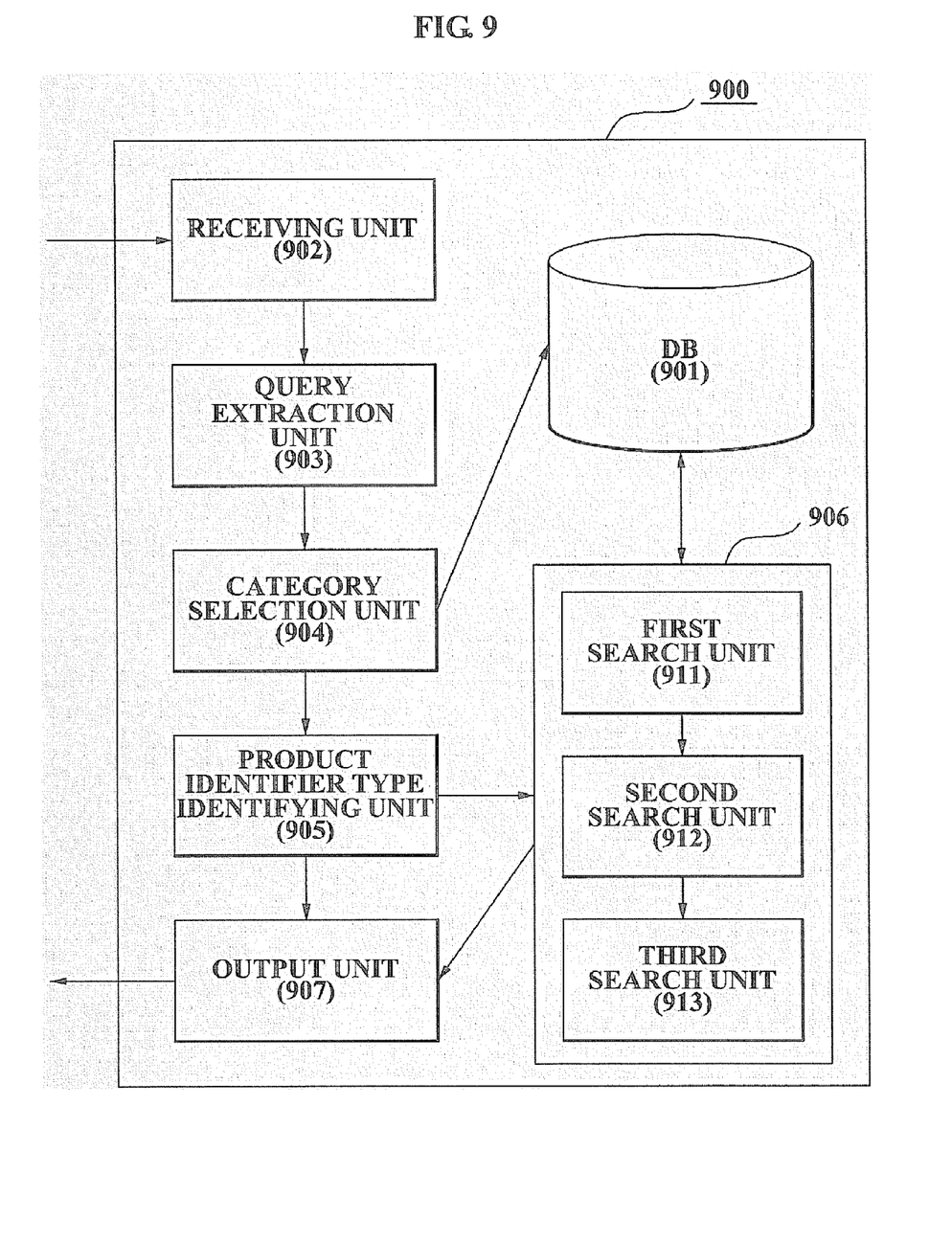
FIG. 9 is a block diagram illustrating a configuration of a product search system according to an embodiment of the present invention.

FIG. 9 is a block diagram illustrating a configuration of a product search system 900 according to an embodiment of the present invention.

As shown in FIG. 9, the product search system 900 according to the present embodiment includes a database 901, a receiving unit 902, a query extraction unit 903, a category selection unit 904, a product identifier type identifying unit 905, a search unit 906, and an output unit 907. In this instance, the search unit 906 may include a first search unit 911, a second search unit 912, and a third search unit 913.

The database 901 includes a product identifier and a product category of the product identifier. The receiving unit 902 receives an original query for search of a product from a user terminal. The query extraction unit 903 extracts a category query associated with the original query. The category selection unit 904 selects at least one product category included in the database 901, as a category corresponding to the original query, using the category query. The product identifier type identifying unit 905 identifies a product identifier type associated with the selected category. The search unit 906 searches the database 901 by applying a search logic, corresponding to the identified product identifier type, from a plurality of search logics. The output unit 907 outputs the search result as a product identifier that matches the original query.

According to an embodiment of the present invention, when the identified product identifier type is an electronics/computer type, the search unit 906 may include: the first search unit 911 searching the database 901 using a first query which is generated by removing a space or a special character from the original query, and generating a first search result; the second search unit 912 separating the original query into a plurality of words according to the space, searching the database 901 by using a word as a second query among the plurality of words, and generating a second search result when a number of the first search results is less than a predetermined reference value, the word comprising at least one of the group including alphabetic characters, numerals, special characters, and combinations thereof; and the third search unit 913 searching the database 901 by using a word as a third query among the second query, and generating a third search result when an addition of the number of the first search results and the number of the second search results is less than the reference value, the word having a first letter as an alphabetic character and having a last letter as an alphabetic character or a numeral, and which includes at least one numeral. Also, in this case, the output unit 907 may output at least one of the first search result, the second search result, and the third search result as the product identifier that matches the original query.

Also, according to another embodiment of the present invention, when the identified product identifier type is a brand type, the search unit 906 may include: the first search unit 911 searching the database 901 using a first query which is generated by removing a space or a special character from the original query, and generating a first search result; the second search unit 912 separating the original query into a plurality of words according to the space, searching the database 901 by using a word as a second query among the plurality of words, and generating a second search result when a number of the first search results is less than a predetermined reference value, the word having a first letter and having a last letter which are alphabetic characters or numerals and including at least one numeral; and the third search unit 913 separating the second query into a space or a special character, generating a plurality of tokens, and searching the database 901 by using a third query which is generated by connecting the plurality of tokens with the space, and generating a third search result, when an addition of the number of the first search results and the number of the second search results is less than the reference value. Also, in this case, the output unit 907 may output at least one of the first search result, the second search result, and the third search result as the product identifier that matches the original query.

Also, according to still another embodiment of the present invention, when the identified product identifier type is a cosmetics, powdered milk, diapers, or other general product identifier type, the search unit 906 may include: the first search unit 911 searching the database 901 using a first query which is generated by removing a space or a special character from the original query, and generating a first search result; the second search unit 912 searching the database 901 using a second query which is generated separating the original query into a plurality of words according to the space, and generating a second search result when a number of the first search results is less than a predetermined reference value; and the third search unit 913 searching the database 901 using a third query which is generated by analyzing a morpheme of the original query, and generating a third search result when an addition of the number of the first search results and the number of the second search results is less than the reference value. Also, in this case, the output unit 907 may output at least one of the first search result, the second search result, and the third search result as the product identifier that matches the original query.

According to the present invention, there is provided a product search method and system which can output a predetermined number of search results that may match an original query entered by a user, by altering a database search method of a conventional shopping-related website that accurately provides only search results including the original query, and thus, processing the original query via a plurality of operations according to various types of search logics.

Also, according to the present invention, there is provided a product search method and system which can more effectively search for a product that may match a corresponding query for each category, by selecting a category corresponding to the query, applying a different search logic according to a product identifier type of the selected category, and thereby, retrieving the goods.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A product search method in a product search system, the method comprising:
    maintaining and storing a database in a memory, the database including a plurality of product identifiers and a plurality of product categories associated with the respective product identifiers;
    maintaining a plurality of search logics associated with categorical types of products, at least one predetermined search logic being assigned to each categorical type of products, each of said plurality of search logics including a set of search steps wherein at least two categorical types of products are associated with at least two different search logics and said at least two different search logics include different sets of search steps;
    receiving a search request including an original query for search of a product from a user terminal;
    determining whether a product identifier corresponding to the original query exists;
    extracting a category query associated with the original query and selecting at least one said product category included in the database using the category query, when the product identifier corresponding to the original query does not exist;
    selecting at least one product category including the product identifier as a category corresponding to the received original query, when the product identifier corresponding to the original query exists;
    identifying a categorical type of product associated with the selected product category;
    determining a search logic corresponding to the categorical type of product from among the plurality of search logics;
    in response to the search request, performing a search of the database for products by applying said determined search logic corresponding to the identified categorical type of product such that different search logics are applied depending on the categorical type of product; and
    outputting a search result including the searched products,
    wherein, when the identified categorical type of product is a first categorical type of product, the predetermined search logic corresponding to the first categorical type of product performs search steps in a predetermined sequence until a number of the searched products included in the search result exceeds a predetermined value, said search steps being selected from the group comprising:
    a search step of generating a first query by removing a space, a special character or both from the original query and of searching the database for products using the first query;
    a search step of generating second queries by separating the original query into a plurality of words according to the space, each of the plurality of words being the second queries, and of searching the database for products by using one or more words among the second queries, each of said one or more words being a combination of at least two selected from the group consisting of English alphabetic characters, numerals, special characters;
    a search step of generating third queries by separating the original query into a plurality of words according to the space, each of the third queries having an initial letter of an English alphabetic character and at least one numeral, and of searching the database for products by using the third queries; and
    a search step of generating fourth queries by separating the original query into a plurality of tokens according to the space based on analyzing the morpheme of the original query, each of the tokens comprising either a group of only alphabetic characters or a group of only numerals, and of searching the database for products by using the fourth queries.

2. The product search method of claim 1, wherein the selecting of the at least one category comprises:
   searching the database using the category query and extracting product identifiers whose similarity to the category query is greater than a predetermined level; and
   selecting at least one product category as a category corresponding to the original query, in an order of a greater number of the extracted product identifiers.

3. The product search method of claim 1, wherein the database further comprises a search field which is generated by using the product identifier and the product Category, and the selecting of at least one said product category comprises:
   searching the database, and extracting product identifiers corresponding to search fields whose similarity to the category query is greater than a predetermined level; and
   selecting at least one product category as a category corresponding to the original query, in an order of a greater number of the extracted product identifiers.

4. The product search method of claim 1, wherein the identified categorical type of product is an electronics/computer type.

5. The product search method of claim 4, wherein the searching of the database further comprises:
   separating the original query into a plurality of tokens using a predetermined engine indexer, searching the database using the tokens, and generating a fourth search result when an addition of the number of the first search results, the number of the second search results, and the number of the third search results is less than the reference value, and
   the product identifier that matches the original query includes the fourth search result.

6. The product search method of claim 5, wherein the searching of the database further comprises:
   generating a fifth search result including at least one token in the database, when an addition of the number of the first search results, the number of the second search results, the number of the third search results, and the number of the fourth search results is less than the reference value, and
   the product identifier that matches the original query includes the fifth search result.

7. The product search method of claim 4, wherein searching of the database using the third query and the generating of the third search result comprises:
   arranging a plurality of third queries according to a descending series based on a length of each of the plurality of third queries; and
   searching the database according to the arranged order and generating the third search result.

8. The method of claim 4, wherein the searching of the database using the third query and the generating of the third search result comprises:
   separating the third query into tokens which comprise a group of only alphabetic characters or a group of only numerals;
   connecting the tokens with a space and generating a fourth query; and
   searching the database using the fourth query, and generating the third search result.

9. The product search method of claim 8, wherein the searching of the database using the fourth query and the generating of the third search result comprises:
   repeating searching the database and generating the third search result, while reducing a number of the tokens included in the fourth query from a tail end of the fourth query; and
   generating a search result as the third search result and stopping the searching, when the search result is found.

10. The method of claim 1, wherein the identified categorical type of product is a brand type.

11. The product search method of claim 1, wherein, when the identified categorical type of product is cosmetics, powdered milk, diapers, or other general categorical type of product, said group further comprising
   a search step of generating a fifth query by analyzing a morpheme of the original query.

12. The product search method of claim 1, wherein, when the identified categorical type of product is an electronics/computer type or a brand type, the search step of generating fourth queries comprises:
   generating a plurality of tokens by processing the original query according to a predetermined separation logic;
   connecting the plurality of tokens with a space and determining the connected plurality of tokens as a search query;
   repeating searching the database and generating the search result, while reducing a number of the tokens included in the search query from a tail end of the search query.

13. The product search method of claim 12, wherein the generating of the plurality of tokens comprises:
   separating the original query into a plurality of words according to the space;
   extracting a word which comprises at least one of the group including alphabetic characters, numeral, special characters, and combinations thereof from the plurality of words; and
   generating the plurality of tokens by separating the extracted word into the plurality of tokens which comprise a group of only alphabetic characters or a group of only numerals, or separating the extracted word into the special characters.

14. One or more non-transitory computer-readable storage media having stored thereon a computer program that, when executed by one or more processors, causes the one or more processors to perform acts including:
   maintaining a database including a plurality of product identifiers and a plurality of product categories associated with the respective product identifiers;
   maintaining a plurality of search logics associated with categorical types of products, at least one predetermined search logic being assigned to each categorical type of products, each of said plurality of search logics including a set of search steps wherein at least two categorical types of products are associated with at least two different search logics and said at least two different search logics include different sets of search steps;
   receiving a search request including an original query for search of a product from a user terminal;
   determining whether a product identifier corresponding to the original query exists;
   extracting a category query associated with the original query and selecting at least one product category included in the database using the category query when the product identifier corresponding to the original query does not exist;
   selecting at least one product category including the product identifier as a category corresponding to the received original query when the product identifier corresponding to the original query exists;
   identifying a categorical type of product associated with the selected product category;

determining a search logic corresponding to the categorical type of product from among the plurality of search logics;

in response to the search request, performing a search of the database for products by applying said determined search logic corresponding to the identified categorical type of product such that different search logics are applied depending on the categorical type of product; and outputting a search result including the searched products, wherein, when the identified categorical type of product is a first categorical type of product, the predetermined search logic corresponding to the first categorical type of product performs search steps in a predetermined sequence until a number of the searched products included in the search result exceeds a predetermined value, said search steps being selected from the group comprising:

a search step of generating a first query by removing a space, a special character or both from the original query and of searching the database for products using the first query;

a search step of generating second queries by separating the original query into a plurality of words according to the space, each of the plurality of words being the second queries, and of searching the database for products by using one or more words among the second queries, each of said one or more words being a combination of at least two selected from the group consisting of English alphabetic characters, numerals, special characters;

a search step of generating third queries by separating the original query into a plurality of words according to the space, each of the third queries having an initial letter of an English alphabetic character and at least one numeral, and of searching the database for products by using the third queries; and a search step of generating fourth queries by separating the original query into a plurality of tokens according to the space based on analyzing the morpheme of the original query, each of the tokens comprising either a group of only alphabetic characters or a group of only numerals, and of searching the database for products by using the fourth queries.

* * * * *